United States Patent
Hsieh

(10) Patent No.: US 11,453,771 B2
(45) Date of Patent: Sep. 27, 2022

(54) RESIN COMPOSITION AND ARTICLE MADE THEREFROM

(71) Applicant: Elite Material Co., Ltd., Taoyuan (TW)

(72) Inventor: Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 77 days.

(21) Appl. No.: 17/203,318

(22) Filed: Mar. 16, 2021

(65) Prior Publication Data

US 2022/0243046 A1 Aug. 4, 2022

(30) Foreign Application Priority Data

Feb. 3, 2021 (TW) ................................. 110103956

(51) Int. Cl.
*C08L 27/18* (2006.01)
(52) U.S. Cl.
CPC ........... *C08L 27/18* (2013.01); *C08L 2205/03* (2013.01)
(58) Field of Classification Search
CPC .... C08F 14/185; C08F 214/182; C08L 27/12; C08L 27/18
See application file for complete search history.

(56) References Cited

U.S. PATENT DOCUMENTS

2016/0045859 A1* 2/2016 Zhang ................... B01D 71/32
95/55

FOREIGN PATENT DOCUMENTS

CN 108517025 A * 9/2018 ........... C07D 319/06

* cited by examiner

*Primary Examiner* — Mark S Kaucher
(74) *Attorney, Agent, or Firm* — Muncy, Geissler, Olds & Lowe, P.C.

(57) ABSTRACT

A resin composition includes 100 parts by weight of a fluorine-containing compound and 1 part by weight to 15 parts by weight of a compound of Formula (1); in Formula (1), m and n are individually an integer of 10 to 100; and the fluorine-containing compound includes tetrafluoroethylene homopolymer, perfluoroalkoxy alkane or a combination thereof. Moreover, also provided is an article made from the resin composition, which comprises a prepreg, a resin film, a laminate or a printed circuit board, wherein the article achieves improvement in at least one of the following properties: dielectric constant, dissipation factor, Z-axis coefficient of thermal expansion, MIT bending resistance and tensile strength.

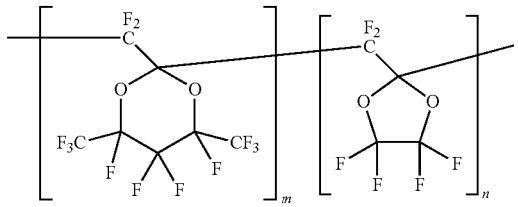

Formula (1)

12 Claims, No Drawings

RESIN COMPOSITION AND ARTICLE MADE THEREFROM

CROSS-REFERENCE TO RELATED APPLICATION

This application claims the priority benefits of Taiwan Patent Application No. 110103956, filed on Feb. 3, 2021. The entirety the above-mentioned patent application is hereby incorporated by reference herein and made a part of this specification.

BACKGROUND

1. Field of the Disclosure

The present disclosure relates to a resin composition and an article made therefrom, more particularly to a resin composition useful for preparing a prepreg, a resin film, a laminate or a printed circuit board.

2. Description of Related Art

Conventional insulation materials for circuit boards include epoxy resins, polyphenylene ether resins, fluororesins and so on; generally, fluororesin materials have the lowest dielectric constant and dissipation factor among all insulation materials, so circuit boards made from the fluororesin materials can be applied to high frequency and high speed transmission purposes such as antenna, automobile radar, radio frequency device, 5G millimeter wave transmission device and the like. However, circuit boards made from the conventional fluororesin materials such as polytetrafluoroethylene have to be subject to lamination at an extremely high temperature and therefore require stringent processing conditions; in addition, they tend to have several drawbacks such as high coefficient of thermal expansion, low laminate tensile strength, low bending resistance, etc. Accordingly, there is need to develop a resin composition which may overcome the problems described above.

SUMMARY

To overcome the problems of prior arts, particularly one or more above-mentioned property demands facing conventional materials, it is a primary object of the present disclosure to provide a resin composition and an article made therefrom which may overcome at least one of the above-mentioned technical problems.

To achieve the above-mentioned object, the present disclosure provides a resin composition, comprising 100 parts by weight of a fluorine-containing compound and 1 part by weight to 15 parts by weight of a compound of Formula (1), Formula (1)

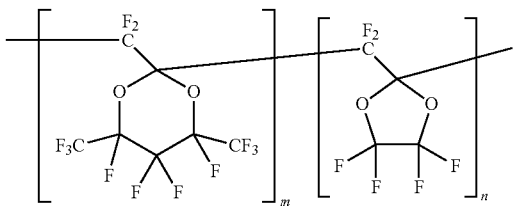

wherein:
in Formula (1), m and n are individually an integer of 10 to 100; and
the fluorine-containing compound comprises tetrafluoroethylene homopolymer, perfluoroalkoxy alkane or a combination thereof.

For example, in one embodiment, the fluorine-containing compound comprises 70 parts by weight to 100 parts by weight of the tetrafluoroethylene homopolymer and 0 part by weight to 30 parts by weight of the perfluoroalkoxy alkane.

For example, in one embodiment, the perfluoroalkoxy alkane comprises a copolymer of tetrafluoroethylene and perfluoroalkyl vinyl ether.

In addition to the fluorine-containing compound and the compound of Formula (1), the resin composition of the present disclosure may further optionally comprise a fluorine-containing additive, wherein the fluorine-containing additive comprises a copolymer of tetrafluoroethylene and hexafluoropropylene, a copolymer of tetrafluoroethylene and ethylene, perfluoropolyether, a copolymer of trifluorochloroethylene and ethylene, polytrifluorochloroethylene, polyvinyl fluoride, fluorine-containing resin or a combination thereof.

In addition to the fluorine-containing compound and the compound of Formula (1), the resin composition of the present disclosure may further optionally comprise surfactant, inorganic filler, silane coupling agent, impregnation aid, solvent or a combination thereof.

For example, in one embodiment, the resin composition of the present disclosure does not contain a thermosetting resin or a thermoplastic resin.

Another main object of the present disclosure is to provide an article made from the aforesaid resin composition, comprising a prepreg, a resin film, a laminate or a printed circuit board.

For example, in one embodiment, articles made from the resin composition disclosed herein have one, more or all of the following properties:
- a dielectric constant as measured by reference to JIS C2565 at 10 GHz of less than or equal to 2.75;
- a dissipation factor as measured by reference to JIS C2565 at 10 GHz of less than or equal to 0.0012;
- a Z-axis coefficient of thermal expansion as measured by reference to IPC-TM-650 2.4.24.5 of less than or equal to 60 ppm/° C.;
- an MIT bending resistance as measured by reference to JIS P 8115 of greater than or equal to 70 cycles; and
- a tensile strength as measured by reference to ASTM D3039 of greater than or equal to 950 MPa.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of" "primarily consisting of" "mainly consisting of" "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "fluorine-containing resin" is construed to encompass a fluorine-containing monomer (a fluorine-containing small molecule compound), a fluorine-containing polymer, a combination of fluorine-containing monomers, a combination of fluorine-containing polymers and a combination of fluorine-containing monomer(s) and fluorine-containing polymer(s).

For example, in the present disclosure, the term "vinyl-containing" is construed to encompass the inclusion of a vinyl group, a vinylene group, an allyl group, a (meth) acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Unless otherwise specified, according to the present disclosure, when the term acrylate or acrylonitrile is expressed as (meth)acrylate or (meth)acrylonitrile, it is intended to comprise both situations of containing and not containing a methyl group; for example, poly(meth)acrylate is construed as including polyacrylate and polymethacrylate. For example, (meth)acrylonitrile is construed as including acrylonitrile and methacrylonitrile.

Unless otherwise specified, an alkyl group and an alkenyl group described herein are construed to encompass various isomers thereof. For example, a propyl group is construed to encompass n-propyl and iso-propyl.

It should be understood that all features disclosed herein may be combined in any way to constitute the solution of the present disclosure, as long as there is no conflict present in the combination of these features.

Unless otherwise specified, as used herein, part(s) by weight represents weight part(s) in any weight unit, such as but not limited to kilogram, gram, pound and so on. For example, 100 parts by weight of the fluorine-containing compound may represent 100 kilograms of the fluorine-containing compound or 100 pounds of the fluorine-containing compound.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

Generally, disclosed herein is a resin composition, comprising 100 parts by weight of a fluorine-containing compound and 1 part by weight to 15 parts by weight of a compound of Formula (1),

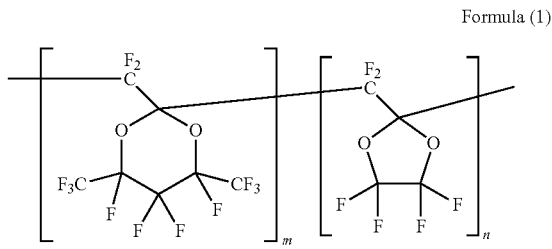

Formula (1)

wherein:
in Formula (1), m and n are individually an integer of 10 to 100; and
the fluorine-containing compound comprises tetrafluoroethylene homopolymer, perfluoroalkoxy alkane or a combination thereof.

For example, in one embodiment, m and n are individually an integer of about 10, 20, 30, 40, 50, 60, 70, 80, 90 or 100, but not limited thereto.

For example, in one embodiment, the fluorine-containing compound comprises 70 parts by weight to 100 parts by weight of the tetrafluoroethylene homopolymer and 0 part by weight to 30 parts by weight of the perfluoroalkoxy alkane. For example, the fluorine-containing compound may comprise 100 parts by weight of the tetrafluoroethylene homopolymer or comprise 95, 90, 85, 80, 75 or 70 parts by weight of the tetrafluoroethylene homopolymer; for example, the fluorine-containing compound may comprise less than 30 parts by weight of the perfluoroalkoxy alkane, such as not comprising the perfluoroalkoxy alkane or comprising 5, 10, 15, 20, 25 or 30 parts by weight of the perfluoroalkoxy alkane.

For example, in one embodiment, the fluorine-containing compound is resinous (e.g., liquid state) or powder-like (e.g., solid state). For example, in one embodiment, the fluorine-containing compound is a semi-crystalline fluorine-containing compound.

For example, in one embodiment, the tetrafluoroethylene homopolymer may comprise tetrafluoroethylene homopolymer solid powder, tetrafluoroethylene homopolymer dispersion or a combination thereof, wherein the tetrafluoroethylene homopolymer dispersion is a solution formed by tetrafluoroethylene homopolymer solid powder, solvent and dispersing agent. In some embodiments, any one or more of the following commercial tetrafluoroethylene homopolymers may be used: DISP 30, DISP 33 or DISP 40 available from Chemours Company, or D-110, D-210, D-210C, D-411, D-711 or D-310 available from Daikin industries, Ltd.

For example, in one embodiment, the perfluoroalkoxy alkane comprises a copolymer of tetrafluoroethylene and perfluoroalkyl vinyl ether. In some embodiments, any one or more of the following copolymer of tetrafluoroethylene and perfluoroalkyl vinyl ether may be used: PFA D 335D available from Chemours Company.

For example, in one embodiment, the compound of Formula (1) is an amorphous compound. For example, in one embodiment, the compound of Formula (1) may comprise Baruch Hyaline PT610 available from Baruch Materials, but not limited thereto.

For example, in one embodiment, relative to 100 parts by weight of the fluorine-containing compound, the amount of the compound of Formula (1) may be 1, 2, 3, 4, 5, 6, 7, 8, 9, 10, 11, 12, 13, 14 or 15 parts by weight.

In addition to the fluorine-containing compound and the compound of Formula (1), the resin composition of the present disclosure may further optionally comprise a fluorine-containing additive, wherein the fluorine-containing additive comprises a copolymer of tetrafluoroethylene and hexafluoropropylene, a copolymer of tetrafluoroethylene and ethylene, perfluoropolyether, a copolymer of trifluorochloroethylene and ethylene, polytrifluorochloroethylene, polyvinyl fluoride, fluorine-containing resin or a combination thereof. Unless otherwise specified, these components should be construed as including their modifications. For example, in one embodiment, relative to 100 parts by weight of the fluorine-containing compound, the amount of any one of the fluorine-containing additives may range from 1 part by weight to 30 parts by weight, such as but not limited to 1 part by weight to 20 parts by weight, 5 parts by weight to 25 parts by weight, 5 parts by weight to 15 parts by weight or 3 parts by weight to 10 parts by weight.

In some embodiments, the fluorine-containing additive may comprise any one or more copolymers of tetrafluoroethylene and hexafluoropropylene. In some embodiments, the fluorine-containing additive may comprise any one or more fluorine-containing resins. For example, in one embodiment, the fluorine-containing additive may comprise FEPD 121 or AF2400 available from Chemours Company, but not limited thereto.

For example, in one embodiment, the resin composition disclosed herein may comprise 90 parts by weight of the tetrafluoroethylene homopolymer, 10 parts by weight of the perfluoroalkoxy alkane and 5 parts by weight of the compound of Formula (1).

In addition to the fluorine-containing compound and the compound of Formula (1), the resin composition of the present disclosure may further optionally comprise surfactant, inorganic filler, silane coupling agent, impregnation aid, solvent or a combination thereof. Unless otherwise specified, these components should be construed as including their modifications. For example, in one embodiment, the content of any one of the aforesaid components may range from 0.01 part by weight to 300 parts by weight, such as but not limited to 0.01 part by weight to 3 parts by weight, 30 parts by weight to 80 parts by weight or 50 parts by weight to 300 parts by weight. In another embodiment, the content of any one of the aforesaid components may range from 1 part by weight to 40 parts by weight, preferably 5 parts by weight to 30 parts by weight.

For example, in one embodiment, the surfactant (a.k.a. dispersing agent) may be any surfactants known in the art. The surfactant suitable for the present disclosure is not particularly limited and may comprise any one or more commercially available products, self-prepared products or a combination thereof. In some embodiments, any one or more of the following surfactants may be used: surfactants available from Chemours Company, surfactants available from Daikin industries, Ltd., HEXAFOR 601 to 695 series surfactants available from MAFLON, fluorine-containing surfactants available from NEOS, Triton X-100 surfactant available from Emperor Chemical Co., Ltd. and fluorine-based functional coating agent available from Voyage Material Limited. For example, in one embodiment, relative to 100 wt % of the dispersion, the content of the surfactant may be 1 wt % to 15 wt %, preferably 5 wt % to 8 wt %.

For example, in one embodiment, the inorganic filler may be any inorganic fillers known in the art. The inorganic filler suitable for the present disclosure is not particularly limited and may comprise any one or more commercially available products, self-prepared products or a combination thereof. In some embodiments, any one or more of the following inorganic fillers may be used: silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, calcined kaolin, hollow porous particle, zirconium tungstate, polytetrafluoroethylene (PTFE) powder, or a combination thereof. Moreover, the inorganic filler can be spherical, fibrous, plate-like, particulate, sheet-like or whisker-like.

Unless otherwise specified, relative to 100 parts by weight of the fluorine-containing compound, in the resin composition disclosed herein, the amount of the inorganic filler described above is not particularly limited and may range from 5 parts by weight to 60 parts by weight, for example. Preferably, the amount of the inorganic filler described above may range from 15 parts by weight to 50 parts by weight or from 3 parts by weight to 35 parts by weight.

For example, in one embodiment, the silane coupling agent may be any silane coupling agents known in the art. The silane coupling agent suitable for the present disclosure is not particularly limited and may comprise any one or more commercially available products, self-prepared products or a combination thereof. In some embodiments, any one or more of the following silane coupling agents available from Shin-Etsu Chemical Co., Ltd. may be used: vinyl-containing silane coupling agent, such as but not limited to KBM-1003; styryl-containing silane coupling agent, such as but not limited to KBM-1403; methacryloxy-containing silane coupling agent, such as but not limited to KBM-503; epoxy-containing silane coupling agent, such as but not limited to KBM-403; and amino-containing silane coupling agent, such as but not limited to KBM-903 or KBM-573. The amount of the silane coupling agent is not particularly limited and may be adjusted according to the dispersivity of inorganic filler used in the resin composition.

For example, in one embodiment, the inorganic filler may be optionally pre-treated with a silane coupling agent so as to adhere the silane coupling agent on the surface of the inorganic filler to obtain the inorganic filler pre-treated with the silane coupling agent to be added to the resin composition disclosed herein.

For example, in one embodiment, the impregnation aid may be various impregnation aids known in the art, such as but not limited to cellulose-based impregnation aid, ester-based impregnation aid, alcohol-based impregnation aid, polyoxyethylene ether, and sodium alkylbenzenesulfonate. The cellulose-based impregnation aid may comprise such as methylcellulose, ethylcellulose, hydroxymethylcellulose, hydroxyethylcellulose, hydroxypropylcellulose, hydroxypropyl methylcellulose, carboxymethyl cellulose, nitrocellulose or a combination thereof. The polyoxyethylene ether may comprise such as nonylphenol polyoxyethylene ether, but not limited thereto.

For example, in one embodiment, the solvent may comprise, but not limited to, water, methanol, ethanol, fluorine-containing solvent or a mixture thereof. The amount of solvent is not particularly limited and may be adjusted according to the viscosity required for the resin composition. For example, in one embodiment, the resin composition disclosed herein may use water as the sole solvent; in another embodiment, the resin composition disclosed herein may use a solvent mixture containing water and a fluorine-containing solvent. The fluorine-containing solvent may comprise FC-40, FC-43, FC-70, or FC-72, available from 3M, or a combination thereof.

For example, in one embodiment, the resin composition of the present disclosure does not contain a thermosetting resin or a thermoplastic resin. The presence of a thermosetting resin or a thermoplastic resin in the resin composition will significantly deteriorate the compatibility of the resin composition and deteriorate the dissipation factor.

For example, the thermosetting resin comprises: cyanate ester resin, active ester, hydrogenated polyolefin resin, vinylbenzyl-dicyclopentadiene phenylene ether, bis(vinylbenzyl)ether, divinylbenzene, triallyl cyanurate, 1,2,4-trivinyl cyclohexane, diallyl bisphenol A, styrene monomer, polystyrene, acrylate, epoxy resin, phenolic resin, benzoxazine resin, styrene maleic anhydride resin, amine curing agent, or a combination thereof.

For example, the thermoplastic resin comprises: polyamide, polyimide or a combination thereof.

The resin compositions of various embodiments of the present disclosure may be processed by various methods into different articles, including but not limited to a prepreg, a resin film, a laminate or a printed circuit board.

For example, the resin compositions of various embodiments may be used to make prepregs. Ingredients of the resin composition are added to a stirred tank and well-mixed and stirred homogeneously to obtain a dispersion which is then loaded to the impregnation tank. The reinforcement material is immersed in the impregnation tank to adhere the resin composition on the reinforcement material, followed by baking to cure and form the resin composition on the reinforcement material. One or more impregnation and baking processes may be performed as needed, so as to obtain a prepreg. For example, 2 to 5 times of the impregnation and baking processes may be repeated to obtain a prepreg having a desired thickness. Unless otherwise specified, the prepreg generally does not contain surfactant, impregnation aid and ethylene glycol because these components have been removed during the baking stage.

In one embodiment, for example, the prepreg disclosed herein has a reinforcement material and a layered structure formed thereon, wherein the layered structure is formed by heating to melt the resin composition at high temperature. The baking temperature for making the prepreg disclosed herein may be divided into a drying section of 90° C. to 150° C., a baking section of 200° C. to 300° C. and a sintering section of 350° C. to 400° C., wherein each heating section may be optionally maintained for 3 to 30 minutes.

The reinforcement material may be any one of woven fabric and non-woven fabric, and the woven fabric may comprise fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. The non-woven fabric comprises liquid crystal polymer non-woven fabric and fluorine-containing non-woven fabric; the liquid crystal polymer non-woven fabric may be such as polyester non-woven fabric, polyurethane non-woven fabric and so on, but not limited thereto. The woven fabric may also comprise liquid crystal polymer woven fabric and fluorine-containing woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent.

In one embodiment, for example, the article made from the resin composition disclosed herein may be a resin film. Ingredients of the resin composition are added to a stirred tank, and surfactant and impregnation aid are optionally added and then well-mixed and stirred homogeneously to obtain a dispersion. The dispersion is filtered to remove the solvent, and the filtered substance is dried at a temperature of 230 to 350° C. for 5 to 24 hours and pulverized by a pulverizer to obtain pulverized matter. The pulverized matter is placed in a mixing tank, and 2 wt % to 20 wt % of ethylene glycol relative to 100 wt % of the whole pulverized matter is added to the mixing tank and mixed therein for 2 to 5 hours to obtain a dough-like substance. The dough-like substance is processed by a calender with a calendering temperature of 50 to 200° C. and a calendering pressure of 1 to 10 MPa to form a thin film. The thin film is then baked at 150 to 350° C. for 3 to 48 hours to obtain a resin film with a thickness of such as 100 The resin film generally does not contain surfactant, impregnation aid and ethylene glycol because these components have been removed during the baking stage.

In one embodiment, for example, the article made from the resin composition disclosed herein may be a laminate, which comprises at least two metal foils and at least one insulation layer disposed between the metal foils, wherein the insulation layer is made by melting and sintering the resin composition of the prepreg or resin film at high temperature and high pressure. A suitable lamination temperature may be for example between 350° C. and 400° C., preferably between 380° C. and 400° C., and a curing time may be 60 to 180 minutes, preferably 120 to 180 minutes. A suitable lamination pressure may be for example between 1000 and 1500 psi, and the laminator has to be filled with nitrogen during lamination to prevent the copper foil from being oxidized at high temperature. The metal foil may contain copper, aluminum, nickel, platinum, silver, gold or alloy thereof, such as a copper foil. In a preferred embodiment, the laminate is a copper-clad laminate.

In one embodiment, for example, the laminate may be further processed by conventional build-up or trace formation processes to make a printed circuit board.

In one embodiment, the resin composition disclosed herein may achieve improvement in one or more of the following properties of the article: dielectric constant, dissipation factor, Z-axis coefficient of thermal expansion, MIT bending resistance and tensile strength.

For example, articles made from the resin compositions according to the present disclosure may achieve one, more or all of the following properties:
  a dielectric constant as measured by reference to JIS C2565 at 10 GHz of less than or equal to 2.75, such as between 2.21 and 2.75, or such as less than or equal to 2.52, such as between 2.28 and 2.52;
  a dissipation factor as measured by reference to JIS C2565 at 10 GHz of less than or equal to 0.0012, such as between 0.0008 and 0.0012, or such as less than or equal to 0.0011, such as between 0.0009 and 0.0011;
  a Z-axis coefficient of thermal expansion as measured by reference to IPC-TM-650 2.4.24.5 of less than or equal to 100 ppm/° C., such as less than or equal to 60 ppm/° C., such as between 35 and 60 ppm/° C., or such as less than or equal to 59 ppm/° C., such as between 35 and 59 ppm/° C.;
  an MIT bending resistance as measured by reference to JIS P 8115 of greater than or equal to 70 cycles, such as between 70 and 500 cycles or between 70 and 98 cycles; and
  a tensile strength as measured by reference to ASTM D3039 of greater than or equal to 710 MPa, such as greater than or equal to 950 MPa, such as between 950 and 1425 MPa, or such as greater than or equal to 1100 MPa, such as between 1100 and 1425 MPa.

Raw materials below were used to prepare the resin compositions of various Examples and Comparative Examples of the present disclosure according to the amount listed in Table 1 to Table 4 and further fabricated to prepare test samples.

Materials and reagents used in Examples and Comparative Examples disclosed herein are listed below:
  D-210: tetrafluoroethylene homopolymer, solid content of 60%, available from Daikin industries, Ltd.
  335D: PFA D 335D, copolymer of tetrafluoroethylene and perfluoroalkyl vinyl ether, solid content of 60%, available from DuPont.
  PT610: Baruch Hyaline PT610, the compound of Formula (1), available from Baruch Materials.
  AF2400: fluorine-containing resin, available from Chemours Company.

PEEK: polyetheretherketone, an amorphous substance, available from Victrex.
LCP: liquid crystal polymer, an engineering plastic, available from Kuraray.
MK-16: porous silica, available from 3M.
Zirconium tungstate: available from Suzhou Jinyi New Materials Technology Co., Ltd.
L-5F: low molecular weight polytetrafluoroethylene (PTFE) microparticle powder, having an average particle size of about 4.5 μm, available from Daikin industries, Ltd.
SC-2050 KNK: spherical silica, available from Admatechs.
FC-40: fluorinated liquid, available from 3M.
Deionized water: commercially available.
Reinforcement material A: SMK-025 non-woven fabric, basis weight of 25 g/m$^2$, available from Oribest.
Reinforcement material B: 1078 L-glass fiber fabric, which is a woven fabric, basis weight of 48 g/m$^2$, available from Asahi.
Reinforcement material C: PTFE woven fabric, basis weight of 40 g/m$^2$, available from Lenzing.
Ethylene glycol: commercially available.

Compositions and test results of resin compositions of Examples and Comparative Examples are listed below (in part by weight):

TABLE 1

Resin compositions of Examples (in part by weight) and test results

| Component | | E1 | E2 | E3 | E4 | E5 | E6 |
|---|---|---|---|---|---|---|---|
| fluorine-containing compound | D-210 | 100 | 100 | 90 | 90 | 90 | 95 |
| | 335D | | | 10 | 10 | 10 | 5 |
| compound of Formula (1) | PT610 | 1 | 1 | 5 | 5 | 5 | 7 |
| fluorine-containing additive | AF2400 | | | | | | |
| amorphous substance | PEEK | | | | | | |
| engineering plastic | LCP | | | | | | |
| porous silica | MK-16 | | 15 | 15 | 15 | 25 | 15 |
| ceramic powder | zirconium tungstate | | | | | | 20 |
| PTFE powder | L-5F | | | | | | |
| spherical silica | SC-2050 KNK | | | | | | |
| solvent | FC-40 | 10 | 10 | 50 | 50 | 50 | 70 |
| | deionized water | 50 | 50 | 50 | 50 | 50 | 50 |
| reinforcement material | type | A | A | A | B | A | A |
| Property | Unit | E1 | E2 | E3 | E4 | E5 | E6 |
| Dk@ 10 GHz | — | 2.75 | 2.48 | 2.45 | 2.43 | 2.41 | 2.42 |
| Df@ 10 GHz | — | 0.0012 | 0.0011 | 0.0011 | 0.0012 | 0.0011 | 0.0011 |
| Z-CTE | ppm/° C. | 60 | 50 | 54 | 51 | 54 | 35 |
| MIT bending resistance | cycle | 70 | 95 | 96 | 74 | 98 | 73 |
| tensile strength | Mpa | 950 | 1100 | 1270 | 1124 | 1270 | 1350 |

TABLE 2

Resin compositions of Examples (in part by weight) and test results

| Component | | E7 | E8 | E9 | E10 | E11 | E12 |
|---|---|---|---|---|---|---|---|
| fluorine-containing compound | D-210 | 95 | 80 | 80 | 85 | 70 | 92 |
| | 335D | 5 | 20 | 20 | 15 | 30 | 8 |
| compound of Formula (1) | PT610 | 7 | 10 | 10 | 15 | 12 | 4 |
| fluorine-containing additive | AF2400 | | | | 5 | | 2 |
| amorphous substance | PEEK | | | | | | |
| engineering plastic | LCP | | | | | | |
| porous silica | MK-16 | 15 | 15 | 15 | 15 | 15 | 10 |
| ceramic powder | zirconium tungstate | 35 | | | | | 9 |
| PTFE powder | L-5F | | 5 | 15 | | | 3 |
| spherical silica | SC-2050 KNK | | | | | | |
| solvent | FC-40 | 70 | 100 | 100 | 50 | 50 | 40 |
| | deionized water | 50 | 50 | 50 | 50 | 50 | 50 |
| reinforcement material | type | A | A | A | A | C | A |
| Property | Unit | E7 | E8 | E9 | E10 | E11 | E12 |
| Dk@10 GHz | — | 2.52 | 2.31 | 2.37 | 2.31 | 2.29 | 2.28 |
| Df@10 GHz | — | 0.0011 | 0.0009 | 0.0010 | 0.0010 | 0.0009 | 0.0009 |
| Z-CTE | ppm/° C. | 35 | 54 | 53 | 54 | 59 | 51 |
| MIT bending resistance | cycle | 70 | 82 | 84 | 87 | 88 | 91 |
| tensile strength | Mpa | 1425 | 1380 | 1310 | 1376 | 1280 | 1364 |

TABLE 3

Resin compositions of Comparative Examples (in part by weight) and test results

| Component | | C1 | C2 | C3 | C4 | C5 |
|---|---|---|---|---|---|---|
| fluorine-containing compound | D-210 | 100 | 90 | 90 | 90 | 80 |
| | 335D | | 15 | 10 | 10 | 20 |
| compound of Formula (1) | PT610 | | | | | |
| fluorine-containing additive | AF2400 | | | | | |
| amorphous substance | PEEK | | | 5 | | 5 |
| engineering plastic | LCP | | | | 5 | 5 |
| porous silica | MK-16 | | 15 | 15 | 15 | 15 |
| ceramic powder | zirconium tungstate | | | | | |
| PTFE powder | L-5F | | | | | 5 |
| spherical silica | SC-2050 KNK | | | | | |
| solvent | FC-40 | 10 | 50 | 50 | 50 | 100 |
| | deionized water | 50 | 50 | 50 | 50 | 50 |
| reinforcement material | type | A | A | A | A | A |
| Property | Unit | C1 | C2 | C3 | C4 | C5 |
| Dk@10 GHz | — | 2.89 | 2.43 | 3.31 | 3.03 | 3.00 |
| Df@10 GHz | — | 0.0013 | 0.0010 | 0.0026 | 0.0012 | 0.0011 |
| Z-CTE | ppm/° C. | 75 | 55 | 51 | 53 | 56 |
| MIT bending resistance | cycle | 50 | 66 | 50 | 48 | 48 |
| tensile strength | Mpa | 850 | 830 | 1401 | 1389 | 1438 |

TABLE 4

Resin compositions of Comparative Examples (in part by weight) and test results

| Component | | C6 | C7 | C8 | C9 |
|---|---|---|---|---|---|
| fluorine-containing compound | D-210 | 80 | | 90 | 90 |
| | 335D | | 80 | 10 | 10 |
| compound of Formula (1) | PT610 | | | | |
| fluorine-containing additive | AF2400 | | | | |
| amorphous substance | PEEK | | | | 5 |
| engineering plastic | LCP | | | | |
| porous silica ceramic powder | MK-16 zirconium tungstate | | 15 | | |
| PTFE powder | L-5F | 20 | 20 | | |
| spherical silica | SC-2050 KNK | | | 25 | 25 |
| solvent | FC-40 | | | 10 | 10 |
| | deionized water | 50 | 50 | 50 | 50 |
| reinforcement material | type | A | A | A | A |
| Property | Unit | C6 | C7 | C8 | C9 |
| Dk@10 GHz | — | 2.81 | 2.76 | 3.04 | 3.02 |
| Df@10 GHz | — | 0.0013 | 0.0014 | 0.0015 | 0.0017 |
| Z-CTE | ppm/° C. | 61 | 58 | 52 | 53 |
| MIT bending resistance | cycle | 52 | 48 | 35 | 40 |
| tensile strength | Mpa | 850 | 1000 | 1286 | 1282 |

Samples (specimens) for the properties measured above were prepared as described below and tested and analyzed under specified conditions below.

1. Prepreg: Resin composition from each Example (listed in Table 1 and Table 2) or each Comparative Example (listed in Table 3 and Table 4) was respectively added to a stirred tank and well mixed to form a dispersion. The dispersion was loaded to an impregnation tank, and an reinforcement material (e.g., SMK-025 non-woven fabric, 1078 L-glass fiber fabric or PTFE woven fabric) was immersed in the impregnation tank to adhere the resin composition on the reinforcement material, followed by heating and drying in an oven at 100° C. to 110° C. for 20 minutes, heating and baking at 250° C. to 260° C. for 20 minutes and then heating and sintering at 350° C. to 360° C. for 30 minutes. After being cooled to the room temperature, the sample is again immersed in the impregnation tank to re-adhere the resin composition on the sample, followed by repeating the three-stage heating process as described above. After multiple impregnation and heating cycles, a prepreg with an overall thickness of 0.35 cm was obtained, such as Prepreg A with an overall thickness of 0.35 cm using SMK-025 non-woven fabric (0.20 cm), Prepreg B with a resin content of 64% using 1078 L-glass fiber fabric, or Prepreg C with an overall thickness of 0.35 cm using PTFE woven fabric (0.20 cm).

2. Copper-clad laminate (formed by lamination of one prepreg): Two 18 μm thickness RTFs (reverse treated copper foils) and one prepreg obtained as described above (using the reinforcement material type listed in Table 1 to Table 4) were prepared and stacked in the order of one copper foil, one prepreg and one copper foil, followed by lamination and curing for 2 hours in a high temperature laminator filled with nitrogen at a lamination pressure of 1000 to 1500 psi and a lamination temperature of 380° C. to 390° C. to form a copper-clad laminate (formed by lamination of one prepreg).

3. Copper-free laminate (formed by lamination of one prepreg): Each aforesaid copper-clad laminate (formed by lamination of one prepreg) was etched to remove the copper foils on both sides to obtain a copper-free laminate (formed by lamination of one prepreg).

4. Resin film: 90 parts by weight of D-210, 10 parts by weight of 335D, 5 parts by weight of PT610, 50 parts by weight of deionized water and 15 parts by weight of MK-16 were added to and stirred in a stirred tank, and 2 parts by weight of a surfactant Triton X-100 and 2 parts by weight of an impregnation aid hydroxyethylcellulose were then added and well mixed and stirred homogeneously to obtain a dispersion. The dispersion was filtered to remove the solvent, and the filtered substance was dried at a temperature of 250° C. for 5 hours and pulverized by a pulverizer to obtain pulverized matter. The pulverized matter was placed in a mixing tank, and 50 wt % of ethylene glycol relative to 100 wt % of the whole pulverized matter was added to the mixing tank and mixed therein for 3 hours to obtain a dough-like substance. The dough-like substance was then processed by a calender with a calendering temperature of 180° C. and a calendering pressure of 5 MPa to form a thin film. The thin film was then baked at 350° C. for 24 hours to obtain a resin film with a thickness of 100 μm. The resin film generally does not contain Triton X-100, hydroxyethylcellulose and ethylene glycol because these components were removed from the resin film during the baking stage.

5. Copper-clad laminate (formed by lamination of one resin film): Two 18 μm thickness RTFs (reverse treated copper foils) and one resin film obtained as described above were prepared and stacked in the order of one copper foil, one resin film and one copper foil, followed by lamination and curing for 2 hours in a high temperature laminator filled with nitrogen with a lamination pressure of 1200 psi and a lamination temperature of 380° C. to 390° C. to form a copper-clad laminate (formed by lamination of one resin film).

6. Copper-free laminate (formed by lamination of one resin film): Each aforesaid copper-clad laminate (formed by lamination of one resin film) was etched to remove the copper foils on both sides to obtain a copper-free laminate (formed by lamination of one resin film).

For each sample, test items and test methods are described below.

Dielectric Constant (Dk)

The aforesaid copper-free laminate (obtained by laminating one prepreg) sample was subject to dielectric constant measurement. Each sample was measured by using a microwave dielectrometer (available from AET Corp.) by reference to JIS C2565 at room temperature (about 25° C.) and under 10 GHz frequency. Lower dielectric constant represents better dielectric properties of the sample. Under a 10 GHz frequency, for a Dk value of less than 3.00, a difference in Dk value of less than 0.01 represents no substantial difference in dielectric constant in different laminates, and a difference in Dk value of greater than or equal to 0.01 represents a substantial difference (i.e., significant technical difficulty) in dielectric constant in different laminates. Under a 10 GHz frequency, for a Dk value of between 3.01 and 3.50, a difference in Dk value of less than 0.05 represents no substantial difference in dielectric constant in different laminates, and a difference in Dk value of greater than or equal to 0.05 represents a substantial difference in dielectric constant in different laminates.

Dissipation Factor (Df)

The aforesaid copper-free laminate (obtained by laminating one prepreg) was subject to dissipation factor measurement. Each sample was measured by using a microwave dielectrometer (available from AET Corp.) by reference to JIS C2565 at room temperature (about 25° C.) and under 10 GHz frequency. Lower dissipation factor represents better dielectric properties of the sample. Under a 10 GHz frequency, for a Df value of less than 0.0030, a difference in Df of less than 0.0001 represents no substantial difference in dissipation factor in different laminates, and a difference in Df value of greater than or equal to 0.0001 represents a substantial difference (i.e., significant technical difficulty) in dissipation factor in different laminates.

Z-Axis Coefficient of Thermal Cxpansion (Z-CTE)

The copper-free laminate (obtained by laminating one prepreg) sample was tested by thermal mechanical analysis (TMA) during the measurement of Z-axis coefficient of thermal expansion. The copper-free laminate was cut into a sample with a length of 10 mm and a width of 10 mm. Each sample was heated from 35° C. to 300° C. at a temperature increase rate of 10° C./minute and then subject to the measurement of thermal expansion coefficient (ppm/° C.) in Z-axis in a range ($\alpha$1) from 50° C. to 140° C. by reference to the processes described in IPC-TM-650 2.4.24.5. Lower Z-axis coefficient of thermal expansion represents a better dimensional expansion property. A difference in Z-axis coefficient of thermal expansion of greater than or equal to 1 ppm/° C. represents a substantial difference (i.e., significant technical difficulty) in Z-axis coefficient of thermal expansion in different laminates. For example, articles made from the resin composition disclosed herein have a Z-axis coefficient of thermal expansion as measured by reference to IPC-TM-650 2.4.24.5 of less than or equal to 100 ppm/° C., such as less than or equal to 60 ppm/° C., such as between 35 and 60 ppm/° C., or such as less than or equal to 59 ppm/° C., such as between 35 and 59 ppm/° C.

MIT Bending Test

The copper-clad laminate (obtained by laminating one prepreg) was chosen and cut into a sample with a length of 150 cm and a width of 10 cm. By reference to the processes of JIS P8115, an MIT bending resistance tester was used to measure the bending resistance of each sample, i.e., the number of cycles of bending before cracking. If the sample was cracked at the $50^{th}$ cycle, the number of cycles before cracking is recorded as 49.

Tensile Strength

The copper-free laminate (obtained by laminating one prepreg) was chosen and cut into a sample with a length of 250 cm and a width of 25 cm. By reference to the processes of ASTM D3039, a tensile strength tester was used to measure the tensile strength (MPa) of each sample. A difference in tensile strength of greater than or equal to 50 MPa represents a substantial difference (i.e., significant technical difficulty) in tensile strength in different laminates.

In addition, the copper-clad laminate (obtained by laminating one resin film) and the copper-free laminate (obtained by laminating one resin film) are characterized by, as measured by the test methods described above, a dielectric constant of 2.21, a dissipation factor of 0.0008, a Z-axis coefficient of thermal expansion of 100 ppm/° C., an MIT bending resistance of 500 cycles, and a tensile strength of 710 MPa.

The following observations can be made from Table 1 to Table 4.

A comparison of Example E1 and Comparative Example C1 shows that if the resin composition comprises the compound of Formula (1), improvements may be achieved in dielectric constant, dissipation factor, Z-axis coefficient of thermal expansion, MIT bending resistance and tensile strength.

A comparison of Example E3 and Comparative Example C2, wherein Example E3 uses the compound of Formula (1) and Comparative Example C2 uses the copolymer of tetrafluoroethylene and perfluoroalkyl vinyl ether, shows that Example E3 has better MIT bending resistance and tensile strength. A comparison of Example E3 and Comparative Example C3, wherein Example E3 uses the compound of Formula (1) and Comparative Example C3 uses amorphous polyetheretherketone, shows that Example E3 has better dielectric constant, dissipation factor and MIT bending resistance. A comparison of Example E3 and Comparative Example C4, wherein Example E3 uses the compound of Formula (1) and Comparative Example C4 uses engineering plastic LCP, shows that Example E3 has better dielectric constant and MIT bending resistance.

A comparison of Example E8 and Comparative Example C5, wherein Example E8 uses the compound of Formula (1) and Comparative Example C5 uses a combination of amorphous polyetheretherketone and engineering plastic LCP, shows that Example E8 has better dielectric constant and MIT bending resistance.

From the compositions of Comparative Examples C6 to C9, it is observed that if the resin composition does not comprise 100 parts by weight of the fluorine-containing compound and 1 part by weight to 15 parts by weight of the compound of Formula (1), even if other additive(s) or inorganic filler(s) is added, satisfactory results will not be achieved in at least one of dielectric constant, dissipation factor, MIT bending resistance and tensile strength.

A comparison of Examples E1 to E12 and Comparative Examples C1 to C9 indicates that Examples E1 to E12 can all achieve at the same time a dielectric constant of less than or equal to 2.75, a dissipation factor of less than or equal to 0.0012, a Z-axis coefficient of thermal expansion of less than or equal to 60 ppm/° C., an MIT bending resistance of greater than or equal to 70 cycles and a tensile strength of greater than or equal to 950 MPa.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising 100 parts by weight of a fluorine-containing compound and 1 part by weight to 15 parts by weight of a compound of Formula (1),

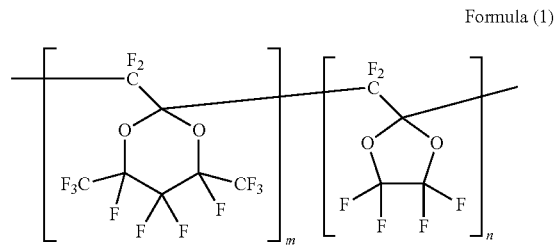

Formula (1)

wherein:
in Formula (1), m and n are individually an integer of 10 to 100; and
the fluorine-containing compound comprises tetrafluoroethylene homopolymer, perfluoroalkoxy alkane or a combination thereof.

2. The resin composition of claim 1, wherein the fluorine-containing compound comprises 70 parts by weight to 100 parts by weight of the tetrafluoroethylene homopolymer and 0 part by weight to 30 parts by weight of the perfluoroalkoxy alkane.

3. The resin composition of claim 1, wherein the perfluoroalkoxy alkane comprises a copolymer of tetrafluoroethylene and perfluoroalkyl vinyl ether.

4. The resin composition of claim 1, further comprising a fluorine-containing additive, wherein the fluorine-containing additive comprises a copolymer of tetrafluoroethylene and hexafluoropropylene, a copolymer of tetrafluoroethylene and ethylene, perfluoropolyether, a copolymer of trifluorochloroethylene and ethylene, polytrifluorochloroethylene, polyvinyl fluoride, fluorine-containing resin or a combination thereof.

5. The resin composition of claim 1, further comprising surfactant, inorganic filler, silane coupling agent, impregnation aid, solvent or a combination thereof.

6. The resin composition of claim 1, characterized by not containing a thermosetting resin or a thermoplastic resin.

7. An article made from the resin composition of claim 1, comprising a prepreg, a resin film, a laminate or a printed circuit board.

8. The article of claim 7, having a dielectric constant as measured by reference to JIS C2565 at 10 GHz of less than or equal to 2.75.

9. The article of claim 7, having a dissipation factor as measured by reference to JIS C2565 at 10 GHz of less than or equal to 0.0012.

10. The article of claim 7, having a Z-axis coefficient of thermal expansion as measured by reference to IPC-TM-650 2.4.24.5 of less than or equal to 60 ppm/° C.

11. The article of claim 7, having an MIT bending resistance as measured by reference to JIS P 8115 of greater than or equal to 70 cycles.

12. The article of claim 7, having a tensile strength as measured by reference to ASTM D3039 of greater than or equal to 950 MPa.

* * * * *